United States Patent [19]
Nii et al.

[11] Patent Number: 5,574,322
[45] Date of Patent: Nov. 12, 1996

[54] MOTOR, A PRINTER HAVING SUCH A MOTOR AND A DISK DRIVE SYSTEM HAVING SUCH A MOTOR

[75] Inventors: Katsutoshi Nii; Takeshi Nakajima; Ichiro Hashimoto; Satosi Uno; Sueo Akashi, all of Hitachi, Japan

[73] Assignee: Hitachi, Ltd., Tokyo, Japan

[21] Appl. No.: 114,176

[22] Filed: Sep. 1, 1993

[30] Foreign Application Priority Data

Sep. 3, 1992 [JP] Japan .................................. 4-235608

[51] Int. Cl.⁶ ........................................................ H02K 7/09
[52] U.S. Cl. .............................. 310/90.5; 310/10; 310/156
[58] Field of Search ..................................... 310/90.5, 152, 310/90; 335/226, 306

[56] References Cited

U.S. PATENT DOCUMENTS

| | | | |
|---|---|---|---|
| 5,010,563 | 4/1991 | Laurent | 310/90.5 |
| 5,043,615 | 8/1991 | Oshima | 310/90.5 |
| 5,117,448 | 5/1992 | Penato | 310/90.5 |
| 5,254,966 | 10/1993 | Solar | 310/90.5 |
| 5,325,006 | 6/1994 | Uno | 310/90 |
| 5,402,023 | 3/1995 | Nakanishi | 310/90 |

FOREIGN PATENT DOCUMENTS

| | | |
|---|---|---|
| 23 37 226 | 7/1973 | Germany . |
| 28 08 125 | 2/1978 | Germany . |
| 201914 | 9/1986 | Japan . |
| 85216 | 4/1988 | Japan . |
| 88314 | 4/1988 | Japan . |
| 150753 | 5/1992 | Japan . |

*Primary Examiner*—Thomas M. Dougherty
*Assistant Examiner*—Elvin G. Enad
*Attorney, Agent, or Firm*—Antonelli, Terry, Stout & Kraus

[57] ABSTRACT

A motor has a rotor mounted on a stator to rotate about a rotation axis. The rotor is driven due to the interaction of a drive coil on the stator and a permanent magnet on the rotor. A magnetic thrust bearing, having permanent magnets on the stator and rotor, applies a radial thrust force. The radially outer surface of the permanent magnet on the rotor abuts a part of the rotor, so as to resist forces on the permanent magnet at high speed rotation or due to thermal deformation. The permanent magnets on the stator and the rotor may be axially offset by an offset of not more than ¼ the axial length of the permanent magnets, or the axial length of the longer of the permanent magnets if they have different axial lengths. This generates an axial thrust at the thrust bearing, which counteracts the attractive force between the permanent magnet and the drive coil, and also the weight of the rotor.

20 Claims, 5 Drawing Sheets

5,574,322

MOTOR, A PRINTER HAVING SUCH A MOTOR AND A DISK DRIVE SYSTEM HAVING SUCH A MOTOR

BACKGROUND OF THE INVENTION

1. Field of the Invention

The present invention relates to a motor, and in particularly to a motor having a stator and a rotor mounted on the stator so as to be rotatable about a rotation axis. The present invention also relates to a printer having such a motor, and a disk drive system having such a motor.

2. Summary of the Prior Art

It is well known to provide a motor with a stator and rotor, and to drive the rotor about a rotation axis using suitable drive means. That drive means may, for example, be a coil mounted on the stator which receives a current which interacts with the magnetic field of a permanent magnet on the rotor to generate a force to rotate the rotor.

In such a motor, it is important that radial movement of the axis of rotation of the rotor is prevented, or at least restrained, and therefore it is known to provide a magnetic thrust bearing which applies a thrust force in a direction radial of the rotor axis between the rotor and the stator. Such a magnetic thrust bearing may comprise a first permanent magnet on the rotor and a second permanent magnet on the stator, with the first and second permanent magnets being concentrically arranged around the rotation axis, and having a radial gap therebetween. By suitable arrangement of the polarity of the first and second permanent magnets, a thrust force may be generated therebetween which stabilizes the rotation of the rotor. A motor incorporating such a magnetic thrust bearing is disclosed in, for example, JP-A-4-150753 (corresponding to U.S. patent application No. 07/629462, now U.S. Pat. No. 5,325,006). Other examples of magnetic thrust bearings are disclosed in JP-A-61-201916, JP-A-62-85216 and JP-A-63-88314.

Motors of the type discussed above are used in printers and disk drives. In a laser printer, the laser beam is caused to scan the surface on which printing is to occur. That scanning is achieved by directing the beam onto a rotating polygonal mirror, so the speed of scanning is determined by the speed of rotation of the polygonal mirror. A motor described above may then be used to rotate the polygonal mirror. Similarly, in a disk drive, a disc is caused to rotate and that rotation may be achieved by a motor described above. To achieve high density of data recordal on the disk, it is necessary to use a high speed of rotation.

SUMMARY OF THE PRESENT INVENTION

For both the printer and the disk drive discussed above, there is a desire to increase the speed of rotation of the motor. This then permits more rapid scanning in the printer, and a greater data density in the disk drive system. In particular, there is a desire to obtain a motor with a rotation speed of greater than 10,000 rotations per minute, preferably 32 to 40,000 rotations per minute.

However, the inventors of the present application have found that such high rotation speeds cause strong forces to be applied to the permanent magnet of the magnetic thrust bearing on the rotor, and these forces can cause the permanent magnet on the rotor to deform in an axially outward direction. Furthermore, the high speeds of rotation may generate considerable amounts of heat, which can cause a rise in temperature and so cause thermal expansion of the permanent magnet on the rotor.

Both of these effects cause the surface of the permanent magnet of the thrust bearing on the rotor to approach closely the opposed surface of the permanent magnet of the thrust bearing on the stator. There is then the risk that those surfaces may contact due to any slight radial movement of the axial rotation of the rotor, which would then damage the thrust bearing. In addition, since the distance between the permanent magnets of the thrust bearing is changed, the force therebetween is also changed and this may affect the performance of the thrust bearing.

Therefore, the present invention proposes, in a first aspect, that the radially outer surface of the permanent magnet on the rotor abuts a part of that rotor. Thus, that abutment prevents radially outward movement of the permanent magnet, either due to the forces caused by rotation or due to thermal expansion, thereby preventing damage to the permanent magnet on the rotor, and preventing thermal expansion in the radially outward direction.

In the prior art documents referred to previously, which employ a magnetic thrust bearing, the permanent magnet on the rotor is then mounted on a radially outer surface of the rotor, and is radially inward of the permanent magnet on the stator. In order to achieve the present invention, it is preferable that the permanent magnet on the rotor is radially outward of the permanent magnet on the stator. This may be achieved by suitable shaping of the rotor and stator, with the permanent magnet on the rotor then being on a radially inner surface of the rotor. Preferably, in this case, the rotor has a slot in that radially inner surface, and the permanent magnet on the rotor is then mounted in that slot. The permanent magnet may then abut an axial wall, (i.e. a wall extending axially) of the slot, to prevent radial outward movement.

However, it is also possible for the first permanent magnet to be radially inward of the second permanent magnet, if the rotor is shaped so as to provide an abutting part on the radially outer surface of the permanent magnet on the rotor. This may be achieved, for example, by providing a slot extending axially in the rotor, and locating the permanent magnet in that slot. A radially outer wall of the slot then may abut the first permanent magnet to prevent axially outward movement.

In either of these two alternatives, adhesive may be used to mount the permanent magnet in the slot, that adhesive then being considered part of the rotor.

Normally, either or both of the permanent magnets on the rotor and stator extend continuously around the rotation axis, and may be, for example, in the form of annuli. It is also possible for either or both of the permanent magnets of the thrust bearing to be formed by a plurality of magnet sections.

The first aspect of the present invention, discussed above, seeks to prevent, or at least to reduce, radial movement of the axis rotation of the rotor. It is also important, however, that axial movement of the rotor is limited. Such axial movement may occur, for example, due to the weight of the rotor or due to the magnetic drive force exerted between a drive coil on the stator and a permanent magnet on the rotor, particularly in arrangements of the motor in which that magnetic drive force is axial. The present inventors have realized that these forces may be counteracted if the permanent magnets on the rotor and stator are not axially aligned, but have a small axial displacement therebetween. Such axial displacement, e.g. of axially outer end surfaces generates a force between the permanent magnets which has an axial component, and that axial component may then be arranged to counteract the weight and/or other magnetic forces on the rotor.

The present inventors have found that axial displacement should not be greater than a quarter of the length of the permanent magnets. For displacements up to quarter of length of the permanent magnets, the arrangement is stable in that increasing displacement (due to weight or other magnetic forces) tends to cause an increase in the force between the permanent magnets of the thrust bearing, that any movement of the rotor is resisted. If, however, the axial displacement is greater than a quarter of the length of the permanent magnets, the arrangement is unstable in that increasing displacement reduces the force. This relative axial displacement of the permanent magnets of the thrust bearing is thus a second, independent, aspect of the present invention.

In the above discussion of the second aspect of the present invention, it is assumed that the permanent magnets have the same axial length. This is not necessary, however, and they may have different axial lengths. Then, the axial displacement should not be more than a quarter of the axial length of the axially longer of the permanent magnets. Furthermore, where the permanent magnets have different lengths, the axial length of the shorter should not be less than ¾ of the axial length of the longer.

In JP-A-4-150753 referred to above, embodiments were disclosed in which there was axial displacement of end surfaces of the permanent magnets on the rotor stated, but there was no discussion of the extent or effect of such axial displacement. Furthermore, the permanent magnets had very different axial lengths. Similarly, in JP-A-63-88314, there was axial displacement of end surfaces of the permanent magnets of the thrust bearing, but again there was no disclosure of the extent or effect of that displacement.

Preferably, when the motor is to be used with the rotor uppermost, the axially outer end surface of the permanent magnets which are displaced in axial direction are upper surfaces, and may then be surfaces remote from the stator. However, it is also possible to arrange the motor so that the corresponding axially outer end surfaces of the permanent magnets are remote from the motor.

It should be noted that, although the second aspect of the present invention seeks to counteract axial movement of the rotor due to the weight of the rotor, and due to magnetic forces between the stator and rotor due to the drive thereof, the present invention is not limited to arrangements in which a motor has particular orientation, and at least some of those forces will exist irrespective of the orientation of the motor. Furthermore, although the first and second aspects of the present invention are independent, they may be used in conjunction.

A motor incorporating the first and/or second aspects of the present invention finds particular advantage as the motor of a printer or a disk drive system. However, the present invention is not limited to such uses of the motor.

BRIEF DESCRIPTION OF THE DRAWINGS

Embodiments of the present invention will now be described in detail, by way of example, with reference to the accompanying drawings, in which.

DETAILED DESCRIPTION

Figure 1:
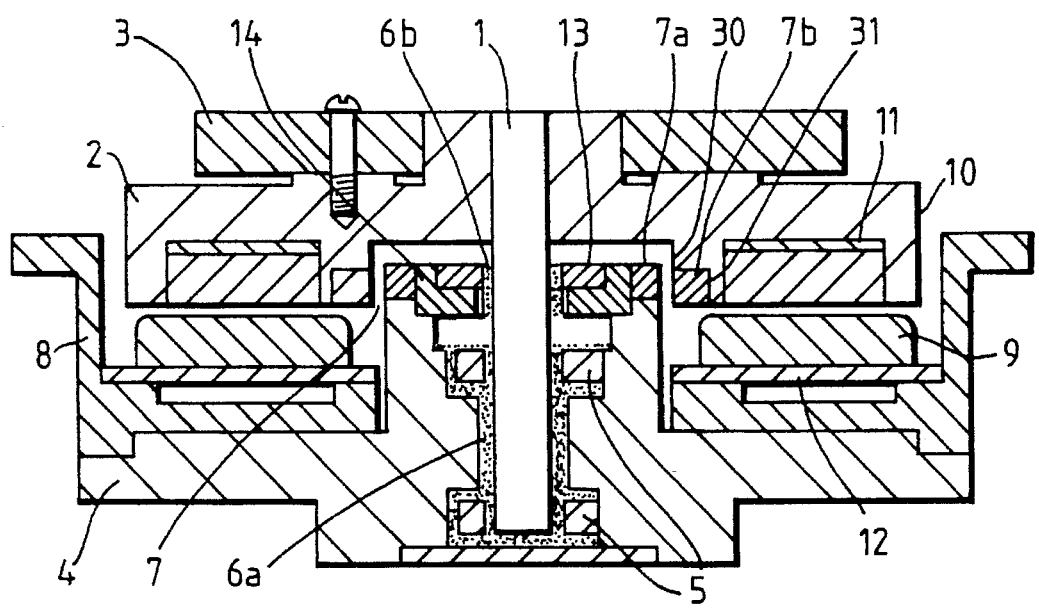
FIG. 1 is a sectional view of a motor being a first embodiment of the present invention.
Figure 2A:
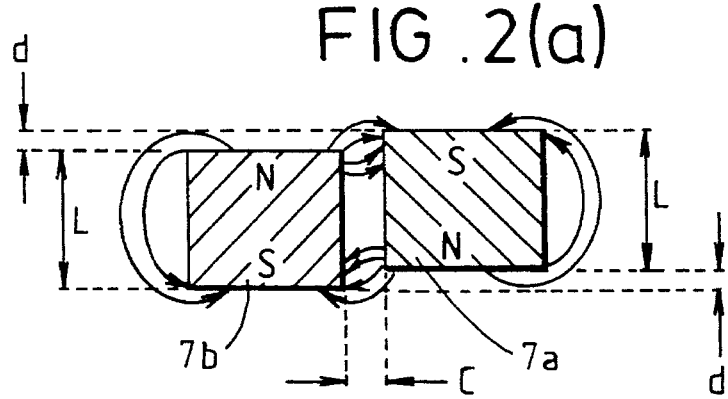
FIGS. 2(a) and 2(b) respectively show the spacing between the permanent magnets of the thrust bearing of the motor of FIG. 1, and the effect of changes of axial displacement of those permanent magnets on the axial thrust force and bearing stiffness.
Figure 2B:
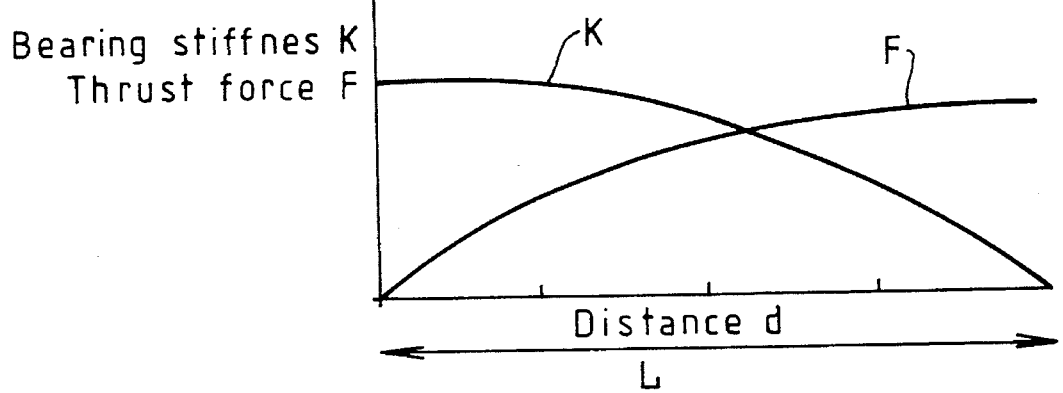
Figure 3:
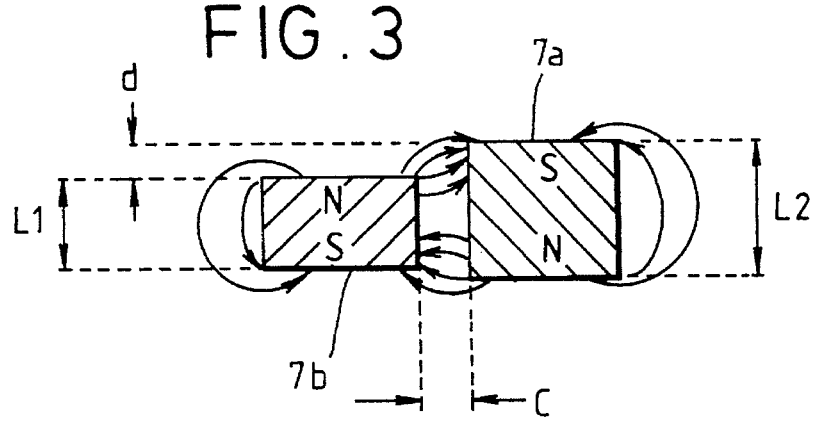
FIG. 3 is similar to FIG. 2(a), but showing that the permanent magnets may be of different axial length.
Figure 4:
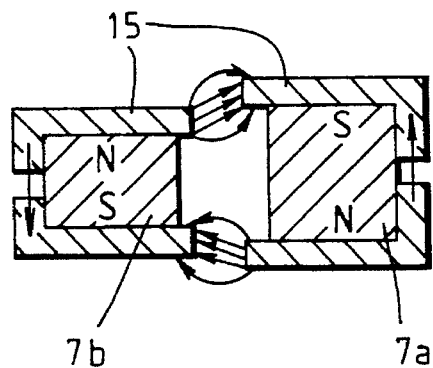
FIG. 4 corresponds to FIG. 3, but shows an arrangement in which the permanent magnet have end plates.

FIG. 1 is a section showing a motor for rotating a polygon mirror of a printer, the motor being a first embodiment of the present invention, and FIGS. 2 to 4 shown the construction of magnetic bearings which are applied to the motor of this embodiment. The embodiment shown in FIG. 1 is a face-opposed type motor, in which there is a multipole flat permanent magnet 10 mounted on a rotor 2 to establish driving magnetic fields in the axial direction. The rotor 2 is fixed to a magnetically permeable shift or spindle 1 and carries the permanent magnet 10, a magnetic plate 11 and a polygon mirror 3. A bearing housing or stator 4 contains radial bearings 5, a magnetic fluid seal 13 using a permanent magnet, and a dynamic viscous seal 14 having a helical groove. Between the bearings 5 and a viscous seal 14, there is a space which is filled with a magnetic fluid 6a. The radial bearings may be made of a sintered alloy, which may be an "oil-containing metal" or an "oilless metal" requiring no oiling. The magnetic fluid seal 13 is shaped so as to extend around the permeable spindle 1. A housing 8 is fixed on the bearing housing or stator 4, to which is attached a motor substrate 12 carrying a stator coil 9 for generating a magnetic field.

The stator 4 and the rotor 2 respectively support ring-shaped permanent magnets 7a and 7b which are magnetized in the axial direction. Thus, the magnetic attraction of the permanent magnets 7a and 7b form a magnetic bearing for the shaft 1. This magnetic bearing is arranged between the radial bearings 5 and the polygon mirror 3, and overhands the radial bearings 5.

As shown in FIGS. 1 and 2a, the axially magnetized, ring-shaped permanent magnets 7a and 7b have a common axis with a predetermined clearance therebetween. They thus form a magnetic circuit in the directions of the arrows in FIG. 2a, so that the magnetic flux is concentrated at the N-S poles of the opposed portions to establish a magnetic attraction. This magnetic attraction provides the bearing action, as it establishes forces in the axial direction and in the radial direction so that the load bearing capacity is determined in dependence upon the sizes of the axial displacement or offset d and the radial clearance C.

If the permanent magnets are displaced in the axial direction, the magnetic flux of the poles is concentrated to enhance the load bearing capacity of the bearing.

In particular, the axial thrust force F between the permanent magnets 7a and 7b varies with the displacement d. FIG. 2b shows the variation in that thrust force F with displacement or offset d, and also shows the variation in bearing stiffness K.

It can be seen from FIG. 2b that the axial thrust force F increases as the axial displacement or offset d increases. When d is less than or equal to ¼·L, where L is the axial length of the permanent magnets 7a, 7b, the increase in thrust force F is approximately proportional to the axial displacement or offset d. Within this region, therefore, the bearing stiffness is approximately constant. However, for axial displacement or offset d greater than ¼·L, the increase in thrust force is not proportional to the distance d. Therefore, the bearing stiffness K decreases as shown in FIG. 2b.

Hence, in order to ensure that the magnetic bearing formed by the permanent magnets 7a and 7b operates correctly, it is necessary that the axial displacement or offset d be less than or equal to ¼·L. For displacements or offset above this, the decrease in bearing stiffness means that the change in rotor dimensions in axial direction for a given thrust force is larger than compared with the case when the displacement or offset is less than or equal to ¼·L. When the motor is used for driving a polygon mirror, significant changes in the axial dimension of the rotor affects the scanning accuracy, and therefore it is important that the motor is operated in the region for which the bearing stiffness is approximately constant.

The above discussion assumes that the permanent magnets 7a and 7b have the same axial length L. FIG. 3 shows an arrangement in which the permanent magnet 7a and 7b have different axial lengths $L_1$ and $L_2$. There are then two factors that have to be taken into account when assuring the axial thrust force F is satisfactory. Firstly, the axial displacement or offset d must be less than or equal to a quarter of the axial length of whichever is longer of the permanent magnet 7b and 7a. Thus, in FIG. 3 the axial displacement or offset d must be less than or equal to ¼·$L_2$. In addition, however, the axial force will be affected by the relative lengths of the permanent magnets 7a and 7b. It has been found that the axial lengths of the shorter of the permanent magnets must not be less than ¾ of the axial length of the permanent magnet. Thus, in FIG. 3, L1 must be greater than or equal to ¾·$L_2$.

The action of the magnetic bearing can be enhanced if the permanent magnets 7a and 7b each have magnetic plates 15 on the axially outer surfaces thereof. This concentrates the magnetic flux in the regions of the opposed ends of the magnetic plates 15, as shown in FIG. 4. A magnetic fluid seal 13 may be arranged in the vicinity of the magnetic plates 15. When the magnetic fluid seal 13 is arranged in the vicinity of the magnetic bearings, as shown in FIG. 1, its magnetic fluid 6b may be attracted by the permanent magnet 7a. This makes it necessary to eliminate leakage of the magnetic flux of the magnetic bearing 7. The use of magnetic plates 15 in the shape of letter "L", as shown in FIG. 4, solves that problem. The magnetic flux is concentrated in the magnetic plates 15, so substantially to eliminate the leakage magnetic flux. If the magnetic fluid seal 13 is not significantly influenced by the leaking magnetic flux of the magnetic bearing 7, the magnetic plates 15 may be flat.

FIG. 1 shows a further feature of this embodiment of the present invention. A radially inner surface 30 of the rotor 2 (i.e. a surface which faces the shaft 1), has a slot 31 therein, and the permanent magnet 7b on the rotor is mounted in that slot 31. Thus, the radially outer surface of the permanent magnet 7b on the rotor abuts a part of the rotor. The effect of this is to protect the rotor against deformation. Such deformation can arise, for example, due to the forces exerted on the permanent magnet 7b when the rotor rotates, or due to thermal effects on the permanent magnet 7b. The slot 31 supports the permanent magnet in the radially outer direction, and thus prevents damage to the permanent magnet 7b. The permanent magnet 7b may be secured in the slot 31 by adhesive.

Thus, for a high speed rotation such as several tens of thousands r.p.m. of the polygon mirror motor, the permanent magnet 7b may be broken by the centrifugal force or by the thermal stress resulting from a rise in temperature of the motor. This breakage is prevented in the embodiment by adopting a structure in which the permanent magnet 7b has its radially outer surface abutting the rotor 2.

The operation and effects of the motor and this first embodiment will now be described. If the stator coil 9 is energized in the embodiment of FIG. 1, a rotating magnetic field is established in the axial direction from the coil 9 so that the polygon mirror 3 is rotated by the interaction of the coil 9 with the magnetic field of the permanent magnet 10. An attractive force is established by the interaction of the magnetic field of the coil 9 and the magnetic field of the permanent magnet 10. The rotor 2 is thus attracted toward the coil 9 so that the permanent magnets 7a, 7b of the magnetic bearing are axially displaced downwardly in FIG. 1 which displacement is resisted by the upward axial force generated between the permanent magnets 7a, 7b. The magnetic attraction between the coil 9 and the permanent magnet 10 is within a predetermined range, and force in the thrust direction generated by the permanent magnets 7a, 7b increases as described above, for larger displacements of the permanent magnets 7a,7b of the magnetic bearing. This feature is employed in the present invention to enhance the load bearing capacity of the magnetic bearing.

Thus, during operation, the rotor 2 is attracted toward the coil 9 by the magnetic attraction so that the displacement between the magnets 7a and 7b will increase. If this displacement increases, the magnetic bearing has axial attraction increased to return the rotor 2 to the initial position. Thus, the rotor 2 is held in the position in which its weight of the magnetic attraction between the coil 9 and the rotor, and the attraction generated by the magnetic bearing are balanced, so that its position is not extremely dispersed. This position balance is similar even when the shaft 1 is horizontal.

For vertical rotation, as shown in FIG. 1, the axial load of the rotor is supported by the magnetic attraction of the magnetic bearing, and the load in the radial direction is mainly borne by the fluid bearings 5 which are lubricated by the magnetic fluid. The magnetic bearing also has a radial load bearing capacity so that accurate rotation can be maintained.

For a horizontal rotation, the polygon mirror 3 is carried as a load in the radial direction by the magnetic bearing formed by permanent magnets 7a, 7b. If the embodiment of FIG. 1 is used for horizontal rotation, the rotor has most of its weight supported by the magnetic attraction of the magnetic bearing in the radial direction. Little or no radial load is exerted upon the radial bearings 5 so that sliding contact between the shaft 1 and the bearings 5 is avoided at the starting and stopping of the motor, This eliminates or reduces the problem of the wear of the bearings. Since, the axial position is accurately determined by the magnetic bearing, the rotor is carried wholly out of contact at high speed rotation by the fluid bearings 5 and the magnetic bearing. Thus, ensuring a highly accurate rotation. It can be noted that the present invention can be applied to a motor with an air bearing if the bearings 5 of FIG. 1 are replaced by an air bearing having no seal.

Figure 5:
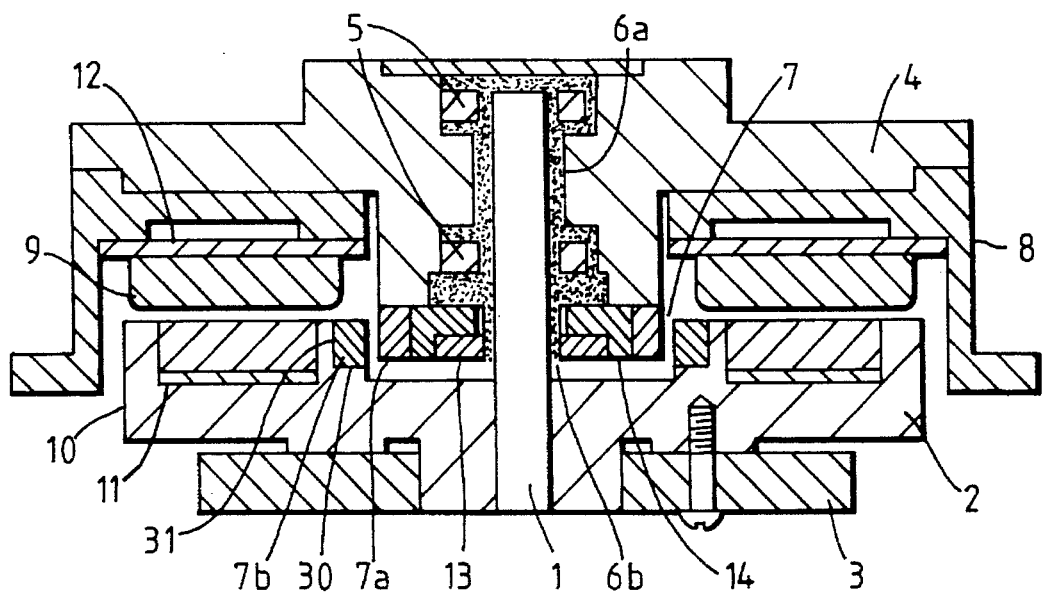
FIG. 5 is a sectional view through a motor being a second embodiment of the present invention.

FIG. 5 illustrates an embodiment in which the rotor 2 is mounted below the stator 4. With one exception, this embodiment is thus the inverted arrangement of the embodiment of FIG. 1, and corresponding components are indicated by the same reference numerals. In the embodiment of FIG. 5, however, the coil 9 and the permanent magnet 10 exert an upward force on the rotor. Since the weight of the rotor is constant, the main fluctuation in the forces between the stator 4 and the rotor 2 is in the upward direction. Therefore, the permanent magnet 7a and 7b of the magnetic bearing are modified, so that the permanent magnet 7b on the rotor has its upper edge displaced downwardly relative to the upper edge of the permanent magnet 7a on the stator. Thus, the relative displacement between the magnet 7a and 7b is in the opposite direction to the embodiment of FIG. 1. Thus, an upwardly directed force is generated by the magnetic bearing on the rotor 2. In the embodiment of FIG. 1, the axially outer surfaces of the permanent magnets are displaced. In FIG. 1, the important displacement is of the axially outer end surfaces which are remote from the stator (although the end surfaces closest to the stator are also displaced) in the embodiment of FIG. 5, on the other hand, the important displacement is the axial displacement of the outer end surfaces which is closest to the stator. (Although again, the other surfaces are also displaced.) FIG. 3 shows that, particularly where the lengths of the permanent magnet 7a and 7b are unequal, the displacement is of the upper axial end surfaces, and the lower axial end surfaces may be aligned.

Known motors using an air bearing cannot avoid some sliding contact between the shaft and the bearing at the starting and stopping of the rotor so that they suffer from the problem of wear. In the present invention, however, the spindle or shaft 1 is kept away from contact with the bearing even while rotating in the horizontal direction, so that a highly accurate rotation can be maintained without the problem of wear of the spindle 1 and the bearing. Thus, it is possible to provide a highly reliable motor.

In the embodiment shown in FIG. 1, leakage of the magnetic fluid when the motor is stationary is prevented by the magnetic fluid seal 13, and the magnetic fluid cannot overflow during rotation due to the viscous seal 14 having a helical groove therein. For high speed rotation, the magnetic fluid in the bearing housing expands in volume, so increasing its internal pressure, due to the heat generated by the bearing. The magnetic fluid 6b in the magnetic fluid seal 13 is sucked to the bearing, by making the pressure of the viscous seal 14 higher than the seal breakdown pressure of the magnetic fluid seal 13 so that the fluid 6b is never scattered outside of the magnetic fluid seal 13. For both vertical rotation and horizontal rotation, that viscous seal 14 can break the magnetic fluid seal instantly to drop the internal pressure of the bearing housing 4 to atmospheric pressure, thereby ensuring reliable sealing. This reliable seal can also be achieved for the reverse rotation of the motor.

Figure 6:
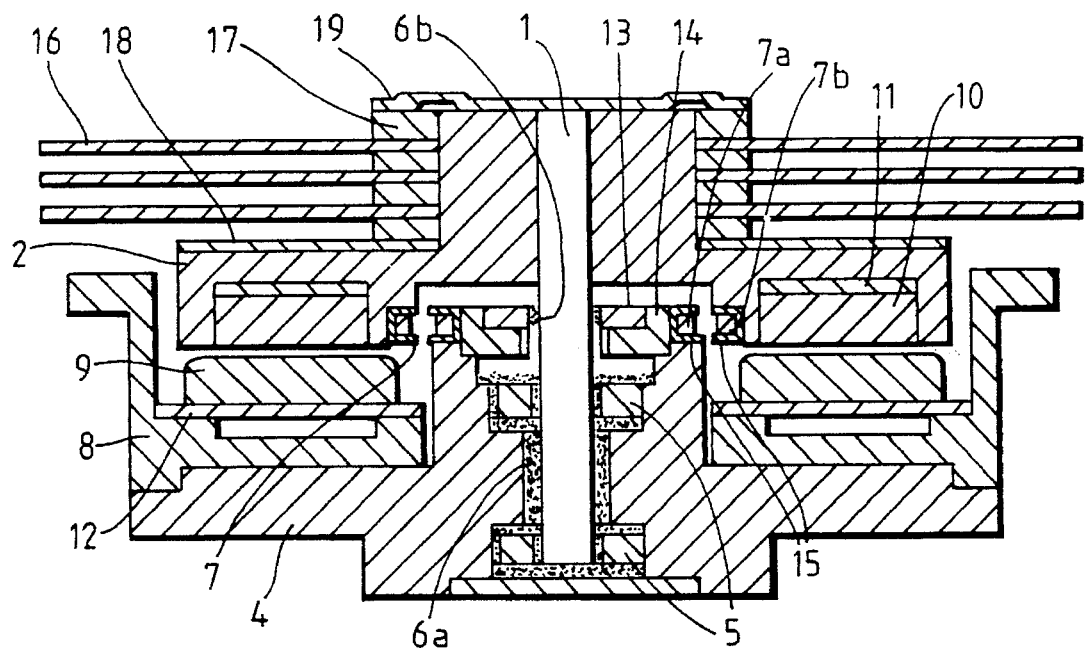
FIG. 6 is a sectional view through a motor being a third embodiment of the present invention.

FIG. 6 shows a third embodiment of a spindle motor, which embodiment is for driving a magnetic disk. The rotor 2 supports a magnetic disk 16 as a load, via a spacer ring 17 and a disc clamp 19. The rest of the construction of the embodiment is similar to that of the polygon mirror motor shown in FIG. 1. For a magnetic disk however, the magnetic disc 16 acting as the load has a weight greater by several times or more that of the polygon mirror 3. Moreover, if the rotating magnetic field of the motor or the magnetic field of the magnetic bearing interacts with the magnetic disk 16, the data written on the disk will be erased. Thus, the load bearing force for the disk must be increased, and leakage of the magnetic flux is eliminated or at least reduced sufficiently by adopting the bearing construction in which there is a magnetic shield plate 18 and in which the magnetic bearing has magnetic plates 15, as shown in FIG. 4.

Existing magnetic disk driving spindle motors are rotated at about 3,600 r.p.m. by using the ball bearing. However, the demand for high speed recording and dense recording means that there is a demand for more accurate and high speed rotation. In this respect, the present invention permits such a demand to be satisfied, to give faster and more accurate rotation by employing a motor having the bearing construction described above, and in particular due to the operation and effect of the magnetic fluid bearing and the magnetic bearing. Similar operations and effects can be achieved if the present invention is applied to an optical disk driving spindle motor, because this motor can have the same construction as that of the magnetic disk driving spindle motor and is required to have substantially the same accuracy.

Figure 7:
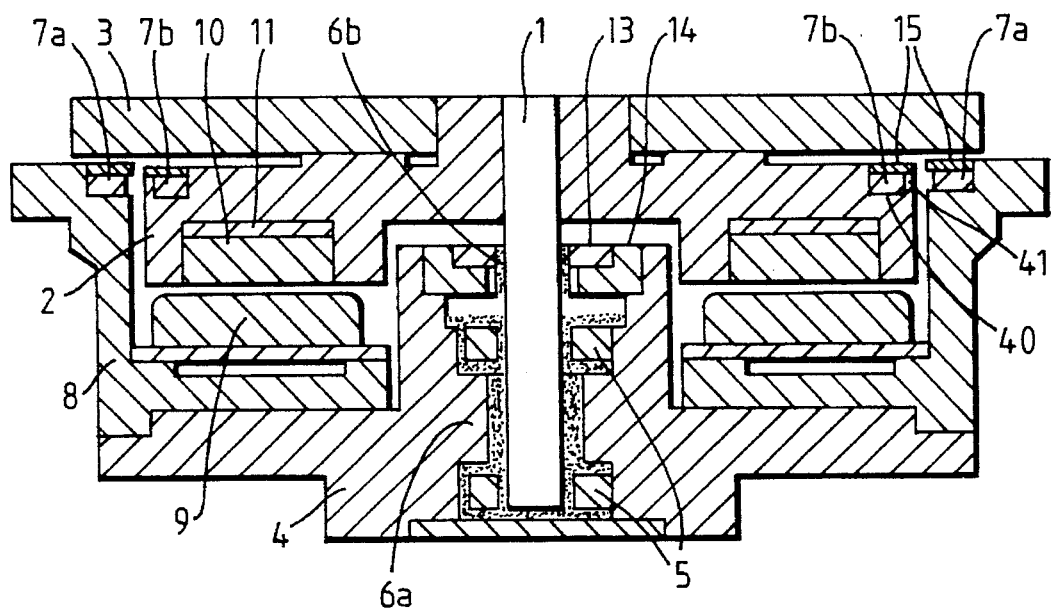
FIG. 7 is a sectional view through a motor being a fourth embodiment of the present invention.

FIG. 7 shows a fourth embodiment of the present invention, for driving a polygon mirror motor. In the third embodiment, the permanent magnets 7a and 7b of the magnetic bearing are supported in the motor housing 8 and the rotor 2. In the third embodiment the magnetic bearing has a higher load bearing capacity because it has a larger diameter than in the first embodiment. Thus, this motor is suitable for a heavy load such as a large-diameter polygon mirror or magnetic disk. In the third embodiment, the permanent magnet 7b in the rotor 2 has its outer circumference fixed in a slot 40 in the rotor 2, so that the separation from the other magnet 7b is to drop the bearing action. In order to concentrate the magnetic flux magnetic plates 15 are used (as in FIG. 4) to improve the action of the bearing.

Thus, in FIG. 7, the slot 40 extends axially into the rotor 2, and the permanent magnet 7b on the rotor is then mounted in the slot. It may be secured in place by adhesive. Thus, a wall 41 of the slot 40 abuts the radially outer surface of the permanent magnet 7b, thereby preventing outward deformation of the permanent magnet 7b due to the forces applied thereto during rotation, or during thermal expansion. Although the wall 41 increases the clearance C (see FIG. 2) between the permanent magnet 7a and 7b, the wall 41 ensures that clearance C is maintained with little or no variation as the rotor 2 rotates. It can be appreciated that, in this embodiment, housing 8 is considered part of the stator. The third embodiment shown in FIG. 7 is otherwise similar to the first embodiment shown in FIG. 1, corresponding parts are indicated by the same reference numerals.

Figure 8:
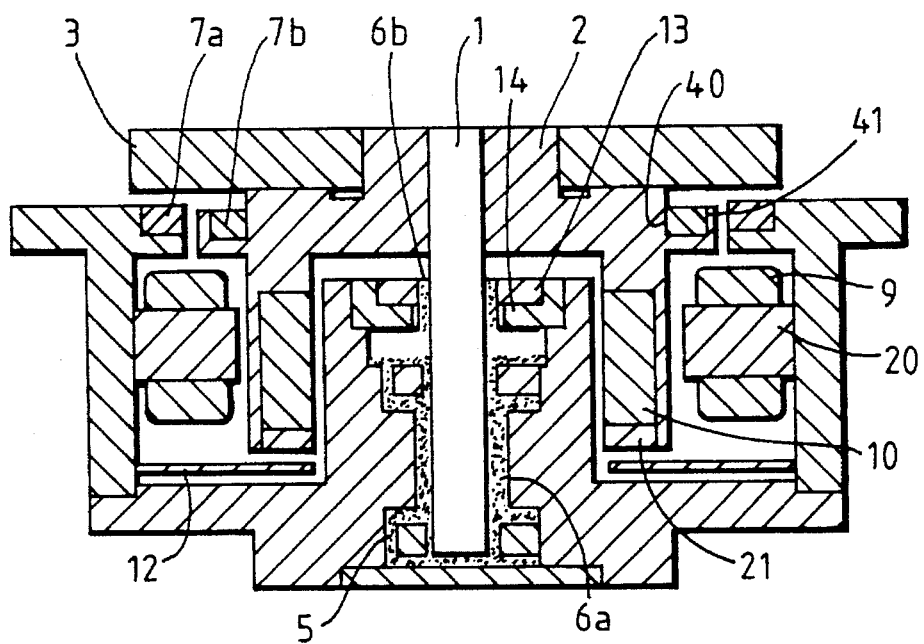
FIG. 8 is a sectional view through a motor being a fifth embodiment of the present invention.

In each of the embodiments of FIGS. 1, 5, 6 and 7, the coil 9 and the permanent magnet 10 generate axial forces therebetween for driving the rotor 2 about the shaft 1. However, the present invention may also be applied to an inner rotor motor type motor, shown in FIG. 8. In FIG. 8, the permanent magnet 10 extends around the shaft 1, and is arranged axially parallel to the plane of the coil 9, which coil 9 has a core 20 which is radially outward of the permanent magnet 10. Thus, in the embodiment of FIG. 8, the forces between the permanent magnet 10 and the coil 9 are axial. FIG. 8 also shows that the permanent magnet 10 is held in place by a wall 21.

In the embodiment of FIG. 8, the permanent magnet 7b on the rotor 2 is mounted in a slot 40, as in the embodiment of FIG. 7. Thus, outward movement thereof is prevented by the wall 41 of the rotor 2, which extends over the axially outer surface of the permanent magnet 7b between that permanent magnet 7b and the permanent magnet 7a on the stator. Apart from this, this fifth embodiment of the present invention is similar to the fourth embodiment shown in FIG. 7, and corresponding parts are indicated by the same reference numerals.

Figure 9:
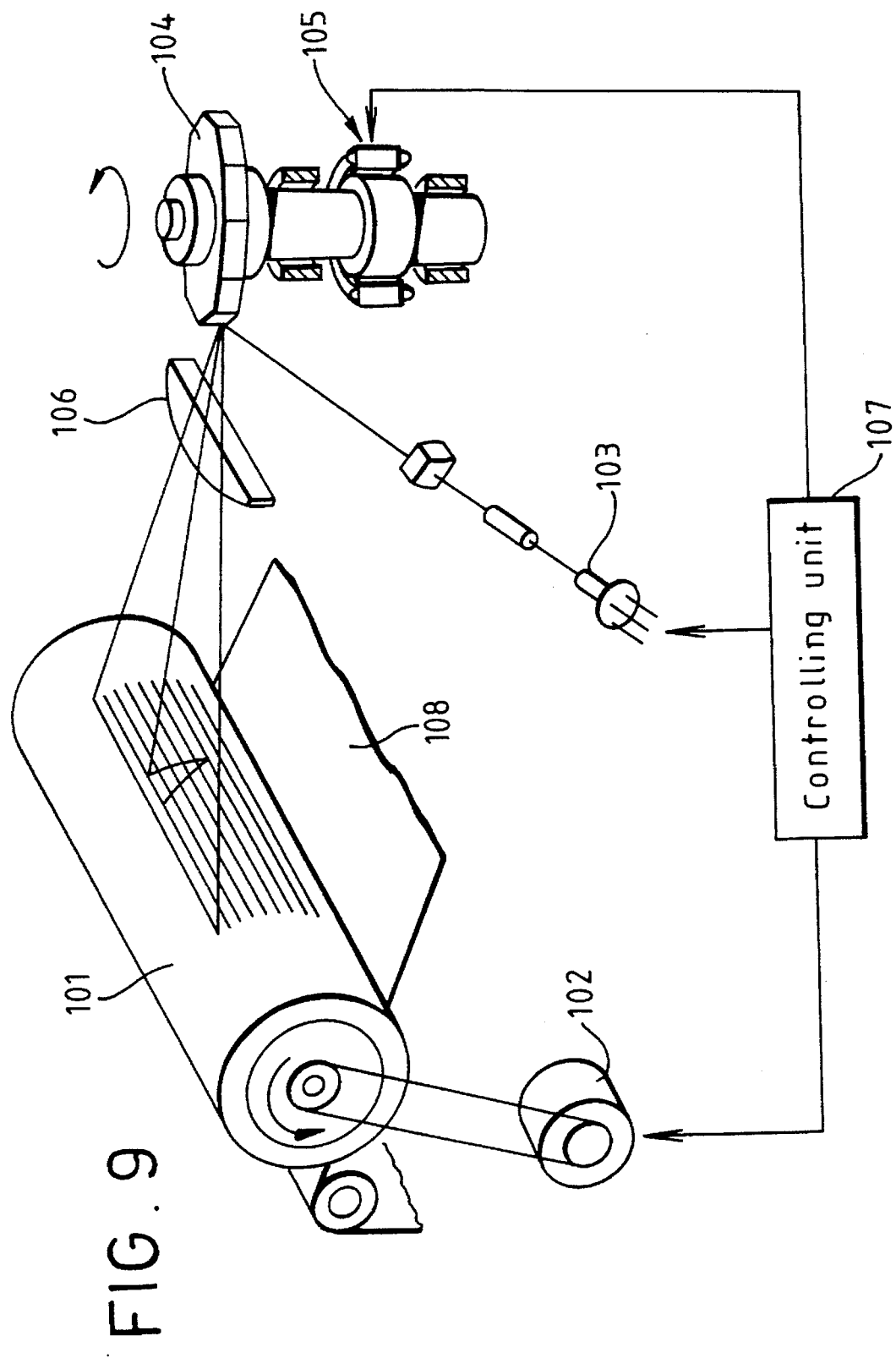
FIG. 9 is a schematic view showing a printer incorporating a motor according to the present invention.

As has previously been mentioned, a motor according to the present invention may be used in a printer, and in particular a laser beam printer. FIG. 9 shows an embodiment of such a printer. In the printer, a photosensitive drum 101 is driven by a motor 102 so that the drum 101 rotates about a longitudinal axis. A light emitting diode 103 emits light towards the edge of a polygon mirror 104, and the light is reflected from one of the surfaces of the polygon through a lens 106 onto the photosensitive drum 101. The polygon mirror 104 is driven by a motor shown schematically at 105. That motor 105 may then be according to one of the embodiments previously described.

When the polygon mirror 104 is rotated by the motor 105, it causes the light from the light emitting diode 103 to scan the photosensitive drum 101. By suitable modulation of the light from the light emitting diode 103, and due to the scanning of that light due to the rotation of the polygon mirror 104, the photosensitive drum 101 is exposed to light in a suitable pattern, thereby forming a latent image.

The rotation of the mirror 105, and hence the polygon mirror 104, the modulation of light from the light emitting diode 103, and the rotation of the photosensitive drum 101 by the motor 102 are controlled by a controlling unit 107, to control the timing of the components so that the latent image on the photosensitive drum 101 has the desired configuration. Then, toner may be adhered to the photosensitive drum 101, due to the static electricity on the photosensitive drum 101 due to exposure by the light from the light emitting diode, and that toner can be transferred to a paper sheet 108.

Figure 10:
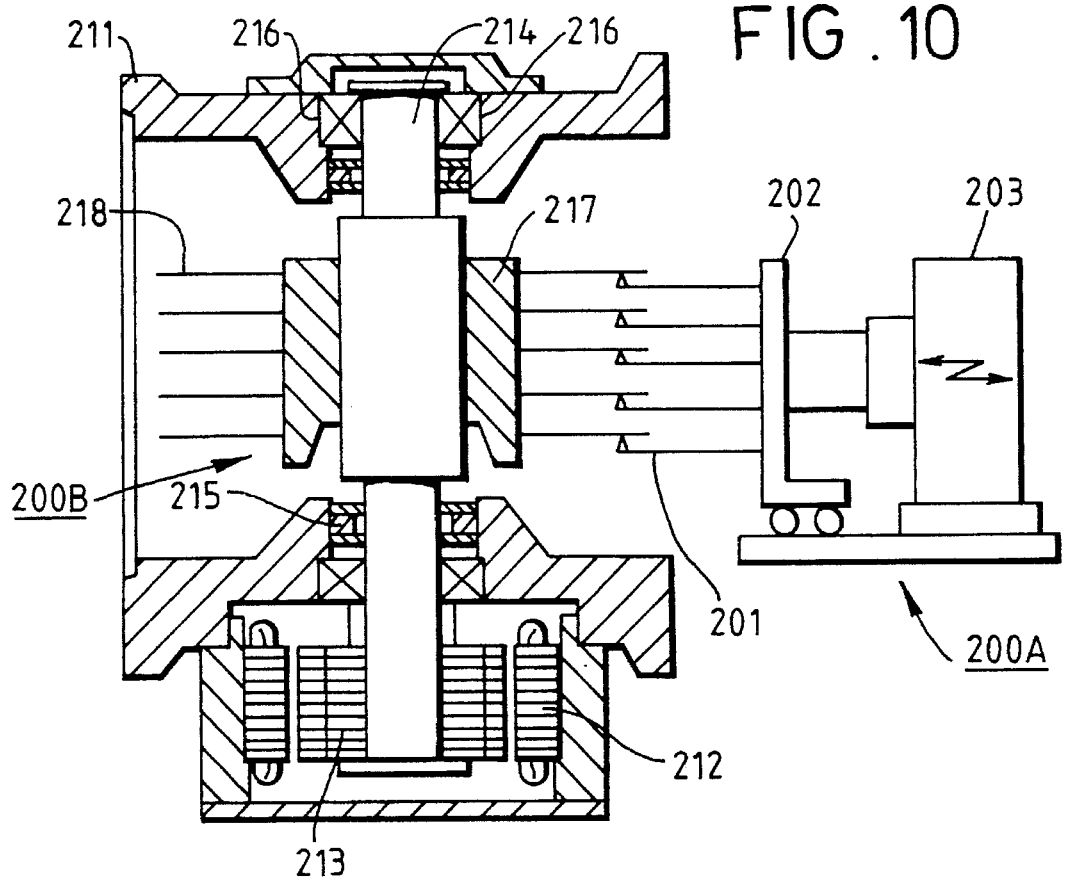
FIG. 10 is a schematic view of a disk drive system incorporating a motor according to the present invention.

FIG. 10 shows another embodiment of the present invention, when applied to a magnetic disk apparatus. That magnetic disk apparatus has a head unit 200 A and a motor unit 200 B. The head unit 200 A comprises a plurality of data read-out heads 201, which are supported on a support 202. That support 202 is movable, with that movement being controlled by a drive mechanism 203. In the embodiment of FIG. 10, the motor unit 200 B is a housing 211, which supports a shaft 214 for rotation about a vertical axis, with that shaft 214 carrying a hub 217 which, in turn carries magnetic disks 218. This embodiment differs from that of FIG. 6 in that the shaft 214 is supported by the housing 211 on both sides of the magnetic disk 218.

In this embodiment, the housing 211 forms a stator, and the shaft 214 forms a rotor. The stator coil 212 is mounted on the housing 211 at the lower end of the shaft 214, and a permanent magnet 213, being the rotor permanent magnet is mounted on the shaft 214. Thus, the shaft 214 is driven by the interaction of the coil 212 and permanent 213. FIG. 10 also shows a magnetic fluid seal 215 and a first bearing 216. That thrust bearing 216 is not shown in detail, but corresponds to the permanent magnet 7a and 7b shown in e.g. FIG. 2, FIG. 3 or FIG. 4.

The magnetic disks 218 carry data, and rotation of the disks 218 due to the motor 200 B combined with radial movement of the heads 201, causes the heads 201 to scan the disks 218, to enable the data to be read.

In the discussion of all the embodiments described above, it is assumed that the permanent magnets 7a and 7b extend continuously around the shaft, so that they are in the form of annuli. It is also possible to form the permanent magnets by having a plurality of curved magnet sections, then there are practical limits to the gaps between such sections if the thrust bearing is to operate satisfactorily.

Thus, in embodiments of the present invention:

1) In a motor in which the rotor carrying the load such as a polygon mirror or a magnetic disk is rotatably borne by the fluid lubricated bearing, the load may be carried so that it overhangs the fluid-lubricated bearing. A magnetic bearing having excellent radial and thrust load bearing capacities is arranged between that load and the fluid-lubricated bearing, thereby maintaining accurate rotation of the motor and shortening the length of the fluid bearing.

2) In the magnetic bearing, ring-shaped permanent magnets may be arranged to face each other at the station side and the rotor side, which are arranged coaxially with a radial clearance therebetween, and with an axial displacement, providing radial and thrust bearing actions.

3) The magnetic bearing may be arranged with permeable magnetic disks at the end of the faces of the ring-shaped permanent magnets so that the magnetic flux may be concentrated at opposed parts of the disks.

4) The magnetic disk may have a structure in which an L-shaped magnetic disc is fixed at the end faces of the ring-shaped permanent magnets so as to concentrate the magnetic flux.

5) Because the magnetic bearing may have opposed faces of the ring-shaped permanent magnets axially displaced, the load bearing capacity is enchanced.

6) Since the opposed faces of the two permanent magnets are axially displaced, the magnetic attraction of the motor may be concentrated.

7) The ring-shaped permanent magnets are arranged to face each other at the station side and at the rotation side with a radial clearance therebetween. The permanent magnets may have difference thicknesses at the station side and at the rotor side.

8) The magnetic bearing may have permanent magnets of a rare earth metal having a high magnetic energy product.

9) The magnetic bearing may be constructed such that its components at the station side are fixed to the bearing housing or the motor housing and the permanent magnet arranged at the rotor side has its outer circumference abutting the rotor, so that its position is fixed.

10) A magnetic fluid bearing may be used in which a magnetic fluid is used for the bearing lubrication and sealing, in which the sealing portion is a composite seal having a dynamic type viscous seal combined with a magnetic fluid seal and in which the bearing unit is partially filled with magnetic fluid.

Thus, according to the present invention, high speed and accurate rotation of the motor can be maintained by arranging a magnetic bearing having excellent radial and thrust load bearing capacity between the load of the rotor and the fluid bearing. Since the load of the rotor can be supported by the magnetic attraction of the magnetic bearing in the radial direction, no wear is caused due to the contact of the fluid bearing even at the starting and stopping of the motor. Thus, it is possible to provide a highly reliable and accurate motor for rotations in any direction.

Since the magnetic bearing has satisfactory effects in the radial and thrust directions, the load of the rotor upon the fluid bearing can be reduced so as to shorten the length of the radial bearing thereby to reduce the size of the motor.

If the present motor is applied to a polygon mirror motor or a spindle motor for driving the magnetic disk or an optical disk, highly accurate rotation can be maintained up to a high speed range for a long time. Thus, the lifetime of the motor is increased and the reliability improved. In addition, the motor can have its size reduced for miniaturization and enhance the performance of the system.

What is claimed is:

1. A motor comprising:

a stator;

a rotor mounted on said stator so as to be rotatable about a rotation axis;

a radial bearing arranged on said stator for supporting said rotor, said radial bearing enabling vibration attenuation in a radial direction;

a magnetic fluid member for lubrication provided in said radial bearing, said magnetic fluid member enabling vibration attenuation in an axial dissection;

drive means for applying a rotative force to said rotor about said rotation axis from said stator; and a magnetic thrust bearing for applying thrust force in a direction radially of said rotation axis between said rotor and said stator, said magnetic thrust bearing comprising a first permanent magnet on said rotor and a second permanent magnet on said stator, said first permanent magnet and said second permanent magnet being concentrically arranged around said rotation axis, having a radial gap therebetween, and being arranged to generate said thrust force therebetween, said first permanent magnet being disposed one of radially outwardly and radially inwardly of said second permanent magnet, said first permanent magnet being solely. magnetized in said axial direction, and said second permanent magnet being magnetized in said axial direction, said first permanent magnet having a radially outer surface abutting a part of said rotor;

wherein both said first permanent magnet and said second permanent magnet are arranged so as to be maintained at a fixed and predetermined relation to each other in said axial direction without any axial direction movement so that said rotor is held without any axial direction movement.

2. A motor according to claim 1, wherein said rotor has a slot in a radially inner surface thereof and said first permanent magnet is mounted in said slot, whereby said first permanent magnet abuts an axial wall of said slot.

3. A motor according to claim 1, wherein said rotor has a slot extending axially therein, and said first permanent magnet is located in said slot, whereby a radially outer wall of said slot abuts said first permanent magnet.

4. A motor according to claim 1, wherein at least one of said first and second permanent magnets extends continuously around said rotation axis.

5. A motor according to claim 1, wherein said drive means comprises a stator coil on said stator and a drive permanent magnet on said rotor.

6. A motor according to claim 1, having a shaft, and said rotor is mounted on said stator via said shaft.

7. A motor according to claim 1, having a shaft, and said rotor is mounted on said stator via said shaft, and there a magnetic fluid seal around said shaft for sealing said magnetic fluid member.

8. A motor according to claim 1, wherein at least one of said first and second permanent magnets have end plates on axial surfaces thereof, said end plates extending radially of said at least one of said first and second permanent magnets.

9. A motor according to claim 1, wherein each of said first and second permanent magnets has end plates on axial surfaces thereof, said end plates of said first permanent magnet extend radially towards said second permanent magnet, and said end plates of said second permanent magnet extend radially towards said first permanent magnet.

10. A motor according to claim 1, wherein said first and second permanent magnets having corresponding axially outer end surfaces which have a relative axial offset therebetween, which relative axial offset is not more than a quarter of an axial length of an axially longer length of one of said first and second permanent magnets.

11. A motor according to claim 1, wherein said first and second permanent magnets are each of a common predetermined axial length and have corresponding axially outer end surfaces which have a relative axial offset therebetween which relative axial offset is not more than a quarter of said common predetermined axial length.

12. A motor comprising:

a stator;

a rotor mounted on said stator so as to be rotatable about a rotation axis;

a radial bearing arranged on said stator for supporting said rotor, said radial bearing enabling vibration attenuation in a radial direction;

a magnetic fluid member for lubrication provided in said radial bearing, said magnetic fluid member enabling vibration attenuation in an axial direction;

drive means for applying a rotative force to said rotor about said rotation axis from said stator;

a magnetic thrust bearing for applying thrust force in a direction radially of said rotation axis between said rotor and said stator, said magnetic thrust bearing comprising a first permanent magnet on said rotor and a second permanent magnet on said stator, said first permanent magnet and said second permanent magnet being concentrically arranged around said rotation axis, having a radial gap therebetween, and being arranged to generate said thrust force therebetween, said first permanent magnet being disposed one of radially outwardly and radially inwardly of said second permanent magnet, said first permanent magnet being solely magnetized in said axial direction, and said second permanent magnet being magnetized in said axial direction, both said first permanent magnet and said second permanent magnet being arranged so as to be maintained at a fixed and predetermined relation to each other in said axial direction without any axial direction movement;

wherein said first permanent magnet and said second permanent magnet having corresponding axially outer end surfaces which have a relative axial offset therebetween, and said relative axial offset is not more than a quarter of an axial length of an axially longer length of one of said first permanent magnet and said second permanent magnet, so that said rotor is held without any axial direction movement.

13. A motor according to claim 12, wherein the axial length of an axially shorter of one of said first and second permanent magnets is not less than ¾ of the axial length of the axially longer of one of said first and second permanent magnets.

14. A motor according to claim 12, wherein said corresponding axially outer end surfaces of said first and second permanent magnets are remote from said stator.

15. A motor according to claim 12, wherein said corresponding axially outer end surfaces of said first and second permanent magnets are remote from said rotor.

16. A motor according to claim 12, wherein said corresponding axially outer end surfaces of said first and second permanent magnets are upper surfaces of said first and second permanent magnets.

17. A motor comprising:

a stator;

a rotor mounted on said stator so as to be rotatable about a rotation axis;

a radial bearing arranged on said stator for supporting said rotor, said radial bearing enabling vibration attenuation in a radial direction;

a magnetic fluid member for lubrication provided in said radial bearing, said magnetic fluid member enabling vibration attenuation in an axial direction;

drive means for applying a rotative force to said rotor about said rotation axis from said stator; and a magnetic thrust bearing for applying thrust force in a direction radially of said rotation axis between said rotor and said stator, said magnetic thrust bearing comprising a first permanent magnet on said rotor and a second permanent magnet on said stator, said first permanent magnet and said second permanent magnet being concentrically arranged around said rotation axis, having a radial gap therebetween, and being arranged to generate said thrust force therebetween, said first permanent magnet being disposed one of radially outwardly and radially inwardly of said second permanent magnet, said first permanent magnet being solely magnetized in said axial direction and said second permanent magnet being magnetized in said axial direction, both said first permanent magnet and said second permanent magnet being arranged so as to be maintained at a fixed and predetermined relation to each other in said axial direction without any axial direction movement;

wherein said first permanent magnet and said second permanent magnet are each of a common predetermined axial length and have corresponding axially outer end surfaces which have a relative axial offset therebetween, and said relative axial offset is not more than a quarter of said common predetermined axial length so that said rotor is held without any axial direction movement.

18. A motor according to claim 17, wherein said corresponding axially outer end surfaces of said first and second permanent magnets are remote from said stator.

19. A motor according to claim 17, wherein said corresponding axially outer end surfaces of said first and second permanent magnets are remote from said rotor.

20. A motor according to claim 17, wherein said corresponding axially outer end surfaces of said first and second permanent magnets are upper surfaces of said first and second permanent magnets.

\* \* \* \* \*